UNITED STATES PATENT OFFICE.

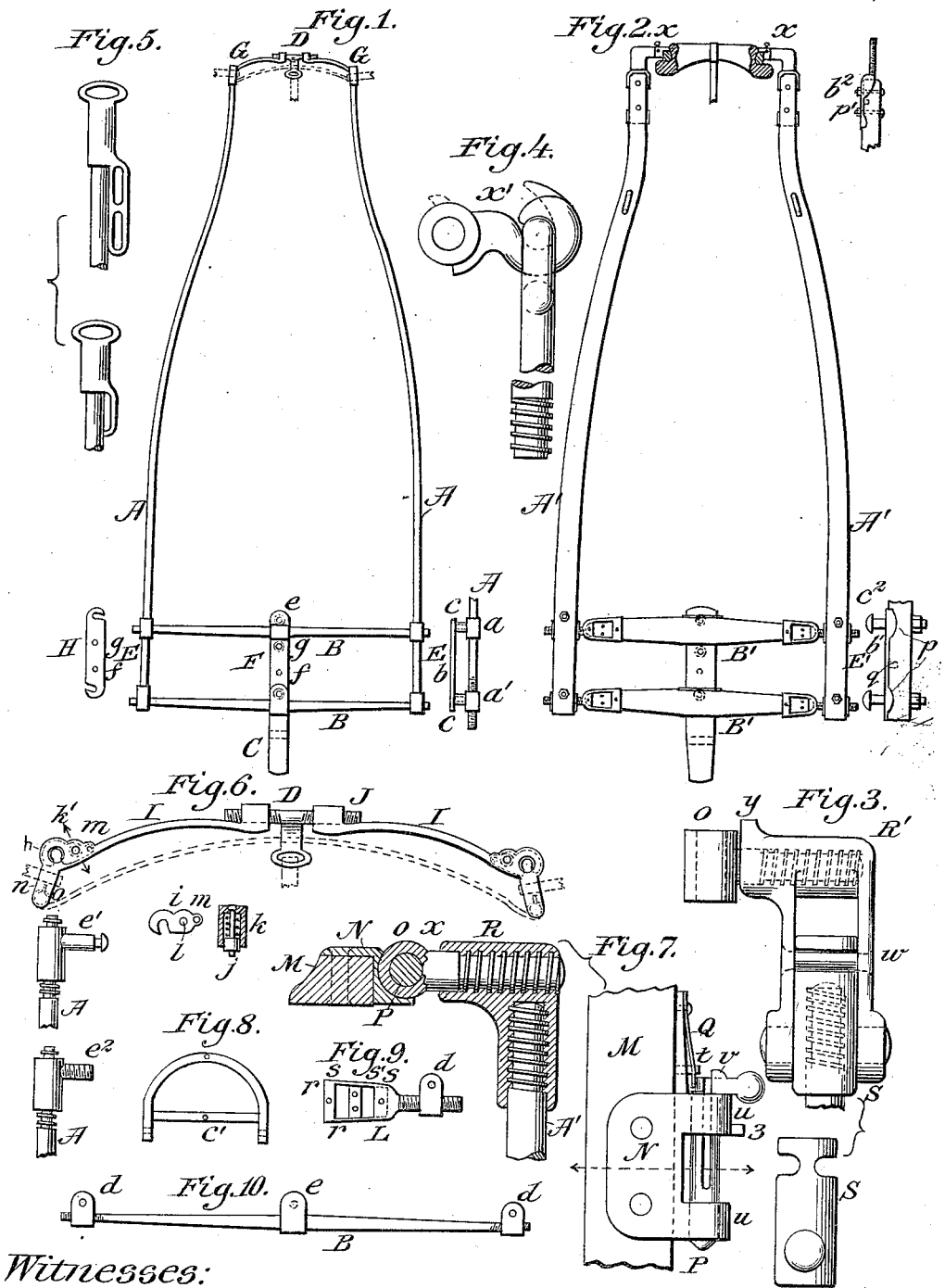

JAMES HAYS ALLIN, OF EAST CHATTANOOGA, TENNESSEE.

COMBINATION-SHAFTS.

1,046,535.  Specification of Letters Patent.  Patented Dec. 10, 1912.

Application filed March 25, 1909, Serial No. 485,855. Renewed April 3, 1912. Serial No. 688,255.

*To all whom it may concern:*

Be it known that I, JAMES HAYS ALLIN, a citizen of the United States, residing at East Chattanooga, in the county of Hamilton and State of Tennessee, have invented certain new and useful Combination-Shafts, of which the following is a specification.

The invention relates to new and novel combination shafts, and consists generally and substantially in a pair of whiffletrees, a pair of shaft trace elements each connected to the respective ends of said whiffletrees and means, preferably a central draft device element, for securing the centers of the trees to a vehicle; and, preferably for best results, provision is made for the tips of the shafts to be hingedly connected together by a substantial whiffle-breast-yoke element. The said central draft element, however, may constitute a part of the vehicle and be permanently secured thereto. The arrangement is such that the shaft-trace elements may freely move to and fro endwise like other traces, and the trees and breast yoke elements all vibrate harmoniously therewith; while the shaft trace elements retain at all times their straight forward relations to the central draft element for guiding and controlling purposes. Thus, these elements all vitally and harmoniously combine for the draft, guidance and control of the vehicle.

It is obvious that the shafts may be carried in the usual way by the back and belly bands; but only imperfectly so, as the guiding strain may fall more severely upon one shaft trace than upon the other. I therefore preferably make special provision for attaching and carrying the shafts, and for firmly hanging them together, at the shoulder, both in breast and collar harness. Thus connected together, the two shaft traces substantially constitute but a single guiding element. And it is obvious that with such an adjustment much lighter shaft trace elements may be used and also much better control of the vehicle secured. Indeed, the invention provides that the vehicle may be perfectly controlled from the tips of the shafts precisely as is universally done in pole or two-horse vehicles. This is a vital primary object of the invention.

As the two-horse or pole rig provides a breast yoke evener to vibrate upon and hold back by the end of the pushing pole between the two animals, so, for the same and kindred reasons and purposes, this invention also, preferably provides a whiffle-breast-yoke element to vibrate upon and hold back by the choke or pole strap between the two ends of the pushing shafts; and as is clearly indicated in Figs. 1, 6 and 9. The arrangement, though reversely disposed, is practically, if not precisely, the same as is commonly provided for in pole or double rigs. And, hence, for breast harness special provision is made for a whiffle-breast-yoke, to the center of which the usual hold down and hold back choke or pole strap may be attached and become the only hold down and hold back means necessary. It is thought that the rear ends of the choke strap attached to the belly-band will prove ample hold down and hold back means for buggies and other light rigs, the same as is common in corresponding double rigs. But the common hip breeching passing from above the hips down and around the sides of the animal and united with the said choke or pole strap at or near the belly band may be used for either light or heavy rigs the same as is common in double or pole rigs. It is worthy of note, however, that this breeching is free from frictional contact with the muscular stepping movements of the animal, moreover, the common pole or choke strap rear breeching may be used at pleasure precisely the same as is common in double rigs. It will be observed, however, that in either of the two latter cases, the back and belly-bands may be entirely dispensed with. However, the usual rear breeching may be used and secured directly to the sides of these shaft traces the same as is done with common shafts. But it must be observed that these shaft traces may freely vibrate in response to the rear stepping movements of the animal in holding back, precisely as they do to the shoulder movements in forward draft. Hence the invention is decidedly humane in protecting the draft animal from the usual rear friction in holding back. Again, for best results, these shaft traces should lie close to the shoulders like other traces, and yet should be stayed apart to prevent undue clamping of the shoulders in holding back, as well as to prevent undue and injurious side clamping of the flexible joints of the trace elements. The whiffle-breast-yoke element, herein provided for, perfectly meets such requirements in addition to its said choke strap hold-down, hold-back and whiffle features. Thus connected, the shaft traces may at all times freely respond to the shoulder movements. In hames and collar harness the hames and collar are preferably made to constitute and act as the breast-yoke element by properly hinging the shaft trace elements directly thereto. And preferably, to better meet the said hold-back features, provision is also made by a joint in the shaft, for rockingly hinging the shafts to the harness with upward and forward restrictions; thereby to lower the shafts in holding back to press more nearly in alinement with the choke-strap connection at the bottom of the collar; as well as to relieve the stiffness of the trace element in the shaft.

It seems evident that some means should be provided for adjusting the distance between the tips of the shafts; and to this end, as well as to provide a more durable draft element, I provide a whiffle-tree screw threaded at its ends for pivotal engagement with a socketed draft device carried by the shaft trace, and as hereinafter more fully set forth. By threading the ends of the whiffle-tree right and left the tree may be rotated, and thereby the tips of the shafts be equally and correspondingly drawn toward each other or spread apart without in the least disturbing the straight-forward alinement of the guiding elements in the shafts. This tree is also specially designed for use generally. It is hoped that small tapering steel rod shaft traces may prove superior and of cheap and easy manufacture with screw-threaded bolt-like ends mounted with draft sleeves. The frictional wear falls upon the draft sleeves, and hence the shaft trace is comparatively everlasting.

It is purposed among numerous other objects to cause all parts of these combination shafts to be manufactured as finished articles of commerce, in separate fitted interchangeable parts, such as may be easily and quickly assembled by any ordinary teamster. It is likewise purposed to furnish combination shafts complete.

With these objects in view, and referring to the accompanying drawings as a part of the specification, we observe that: Figure 1 is a top view of a device embodying my invention; and Fig. 2 illustrates a modification thereof. Figs. 3 and 4 illustrate modifications of the shaft trace connection shown in Fig. 2. Fig. 5 illustrates two modified shaft tips specially designed for light breast harness. The tips may be longer or shorter to lengthen or shorten the shaft trace, and may preferably be secured to the shaft by corresponding screw threaded parts as illustrated under Fig. 6; which shows detail views of the whiffle-breast yoke and its connecting parts, shown in Fig. 1. Fig. 7 shows a sectional view of the hame trace connection shown in Fig. 2, and also a front view of a portion thereof showing the hame carrying its part of the connecting means. Fig. 8 illustrates a modified central draft element, with means for securing the center of each of the whiffletrees thereto, and with double means for vehicle attachment. Fig. 9 illustrates the tree tip shown in Fig. 2; and Fig. 10 shows the tree of Fig. 1. The tree is preferably shown screw-threaded at its ends, the one right and the other left, for adjusting the length of the tree, and hence adjusting the distance between the tips of the shafts, and for attaching to and detaching from the shafts, by a rotary movement of the tree itself.

Referring to the drawing by letters and figures: Fig. 1 illustrates a pair of combination shafts, in which A, A, designate a pair of shaft trace elements; B, B, a pair of whiffletrees; C a centrally disposed draft element; and D a whiffle-breast-yoke element; and E, E designate a pair of compound connections by which the trees are pivotally secured to the shaft traces; F the compound connection by which the trees are centrally pivoted to the centrally disposed draft element; and G, G, the connection by which the shaft traces and the whiffle-breast-yoke element are pivoted together. The whiffletrees may be pivotally connected to the shaft trace elements in any suitable manner; but preferably I have shown by detail side view, shaft trace A carrying T sleeve, $a$, for guiding purposes; and T sleeve, $a'$ by corresponding screw-threaded parts for attaching purposes, for guiding purposes, for draft purposes, and for adjusting the length of the shaft trace. And connector, $b$, carries a pair of tubular lugs over which the whiffletree sleeves, $d$, shown in Fig. 10, may fit and into which thereafter the T lugs of sleeves $a$ and $a'$ are inserted and secured preferably by corresponding screw-threaded parts before the shaft is inserted into said sleeves $a$ and $a'$. Thus a perfectly secure, durable and cheap combination connection may be provide of interchangeable, detachable commercial parts and of easy assemblance without tools. The center of the tree is also shown provided with a connecting pivot, $e$, secured within a socket therefor in the underlying central draft element by a locking plate, H, having its end slotted for engagement in an annular groove in said pivot, $e$, near its free end, similar to the annular groove in the sleeve pivot, $e'$, on tip A of Fig. 6. Said locking plate is pivoted to the draft element at $f$ and detachably secured in locking position by a spring-pressed pivot working in socket $g$ and similar to the locking means shown in Fig. 6 with reference to the whiffle breast yoke and shaft trace connection.

The whiffle breast-yoke may be of any desirable shape or style, but preferably I have shown a pair of breast members, I, I, detachably connected together by a T-shaped choke strap connector, J. This connector preferably has its ends screw-threaded, the one right and the other left, so as to harmoniously adjust the length of the yoke by revolving the connector. In connection, G, the whiffle-breast-yoke, D, is provided at each end with a vertically disposed socket, $h$, adapted to receive and pivotally engage a corresponding pivot, $e'$, on the tip of the shaft trace A. This projection $e'$ may be integral with the shaft trace element, or secured thereto in any desirable manner; but, preferably, the shaft tip is shown screw-threaded with a screw-threaded sleeve thereon carrying said projection $e'$, as illustrated. An annular locking groove is shown provided in the end of the projection $e'$. The whiffle-breast-yoke may be pivotally attached to the shaft trace by inserting projection $e'$ into said socket, $h$, and be detachably secured thereto by means of a locking plate, $i$, and spring-pressed locking pin, $j$, shown in detail cross section, $k$, as indicated by the darts, $k'$. The locking pin, $j$, locks the engaging socket, $l$, in locking plate $i$, which plate is pivoted to the breast-yoke at $m$. The locking means may, however, be applied in any desirable manner; and, when desired, one shaft may be permanently pivoted to the whiffle-breast-yoke or detachably pivoted thereto by means of screw-threaded parts, as indicated by projection $e^2$ on shaft tip A, as shown in detail in Fig. 6; but, preferably, both ends of the whiffle-breast-yoke should detach from the shaft trace elements, for convenience and to allow of better care for the whiffle yoke; and especially so when the yoke is highly ornamented. Each end of the whiffle breast yoke D, is also preferably shown with a rearward projection, $n$, formed substantially into a hollow square or loop. To these projections the harness neck and breast straps may be attached, as indicated by dotted lines. The end of the choke strap is also indicated in dotted lines attached to the central projection of the said choke strap connector, J. By the breast, neck and choke straps the shafts may be perfectly controlled the same as the tongue or pole is controlled in double rigs. The breast strap may even be but a simple strap secured to and within said loop projections, $n$, by a slight pintle, $o$, through a punched hole in the strap. It is hoped, however, that the whiffle-breast-yoke element, when properly shaped to fit the breast and neck, may also serve as the breast element of the harness, the same as the shafts combine with and serve as the trace elements of the harness. It must, however, be observed that the whiffle breast yoke element may be of most any design or style, provided suitable connections be combined therewith to allow of and provide for the necessary vibration thereof relative to and with the shaft trace elements. It is hoped that light tapering steel rod shaft traces may prove preferable, as illustrated in Fig. 1. In the modification shown in Fig. 2, however, the usual wooden shaft is indicated with suitable end connections, E', securing the shaft trace to the tree. In connection E' the connector $b'$ is shown with the socketed lugs $c^2$ thereon turned downward. Draft sleeve, $d$, shown on the end of the tree in Fig. 10 fits over socketed lug, $c^2$, and a bolt, passed upwardly through the socket of lug $c^2$ and the shaft secures the draft sleeve, $d$, to the connector, $b'$, and connects, $b'$, to the shaft trace. Connector $b'$ is also shown provided with side flanges, $p$, which clamp the sides of the shaft trace to prevent splitting and to aid in side strength. A centrally disposed draft pivot, $q$, is also provided on said connector, $b'$ which is fitted into a socket therefor in the shaft for draft purposes. The tip of the shaft is shown mounted with a similar connector, $b^2$ with side lugs, $p'$ and draft lug, $q$ and having a screw-threaded end corresponding to the shaft tip shown in Fig. 6, which may also serve for adjusting the length of the shaft. The whiffletree is also shown with its end provided with a draft tip, L, of special design for casting without a coring. It is shown in detail in Fig. 9, with the shaft sleeve, $d$, mounted thereon and detachably secured thereto by corresponding screw-threaded parts. Said tip L has a pair of side plate-like jaws, $r$, connected together by cross-bars, $s$, at the upper edges thereof, and bars, $s'$ at the lower edges thereof, thus forming a socket between the plates and the bars for the end of the wooden tree. The lower cross-bars substantially intervene the upper cross-bars so as not to conflict in casting the tip without a coring.
Said cross-bars are also shown provided with rivet or bolt sockets for securing the tip to the tree. These sockets may also be cast with the tip. The side guiding strain on the trees in combination shafts, requires specially secured tips.

The modification shown in Fig. 2 also illustrates the use of the collar and hames as the breast-yoke element of the invention. The breast-yoke element functions being added to or combined with the trace functions of the collar and hames by hinging the shaft-traces directly thereto. The collar and hames are shown broken away above the hames shaft trace connection, X. Connection X is also shown in detail cross-section in Fig. 7; with M designating the hame; N the hame plate; O, the shaft trace connector; and P the draft bolt. The spring, Q, automatically locks over the draft or thumb bolt, P. Pin $t$ passes loosely through a socket in the spring and engages the longitudinal groove in the draft thumb bolt, P, when the bolt is turned and raised. Thus the pin, t, engages the lower end of the groove and retains the bolt permanently within the upper draft eye. The lug, v, on the end of the draft bolt engages the pin, t, and thus limits the rotary movement of the bolt and guides the pin, t, into the groove in the bolt. R indicates an L-shaped sleeve connector by which the tip of the shaft, A', and the trace connector, O, are shown transversely pivoted together by corresponding screw-threaded parts; and harness trace connector O is shown pivotally and detachably secured to hames plate N, by thumb-bolt P. The arrangement of the hames-shaft trace connection, X, is such, preferably, that three separate and distinct pivotal joints, each transversely disposed to each of the other two, combine and constitute but the one shaft trace and hames connection. By this triple pivotal pointed combination connection, X, every possible necessary movement of the hames and collar relative to the shaft trace elements is fully provided for. In Fig. 4, X' illustrates a modification showing substantially the same triple jointed combination. Fig. 4, however, shows one of the triple joints removed to the rear end of the shaft trace; the central portion of the shaft being shown broken away. The compound L-shaped hinge connector, R', in Fig. 3, is shown with a shaft sleeve, S, hinged thereto and carrying the tip of shaft A'. By cross pin, w, the upward hinge movement of the shaft trace element is limited. The pin may also serve for draft purposes. The forward hinge movement of the shaft is limited by the lug, y, on compound hinge connector, R' engaging with lug, z, on draft eye, u, of hame plate N. A side view of hinge sleeve, S, is also shown in detail; and, as may be seen, sleeve, S, may be turned in connector R', and adjusted to work on either the right or the left shaft trace before being secured to the shaft. By the hinge arrangement the end of the shaft is lowered in holding back to bring the hold back pressure thereof nearer the hold-back choke or pole strap connection at the bottom of the collar. Hence better control of the vehicle is thereby secured and at the same time the stiffness of the trace element in the shaft is more or less relieved.

Under Fig. 3, hames-trace connector, O, is turned in connector R' to show a sideview of connector O, which is adapted to work on thumb-bolt P between draft eyes u of the hames plate, N, as in Fig. 7. Simply turn the thumb-bolt P toward the hame, and then lift it for detachment, and then reverse the order for attachment.

The cross section of connection X is taken on the dotted lines between draft eyes, u, of the side of the hame view under Fig. 7.

It will be observed that a pair of swingletrees with three pairs of flexible or pivot joint connections are provided. By one pair of said connections each shaft is shown pivotally secured to its respective ends of said trees; and by the central pair of said connections the two trees are shown pivotally secured to a central draft device. It will also be observed that the harness attaching means are here shown simply transferred from the usual swingletree to the side members and to their forward portions. Thus, by these connections, the shafts, viewed as a part of a vehicle, are attachable to a harness; or the shafts viewed as the traces of a harness, are attachable to the rest of the harness. It will be further observed that the two trees may jointly bear the draft; or that either tree may bear the draft, and the other, in combination therewith, simply serve to guide and control the vehicle. And, also, that either tree may be adjustable in length to adjust the distance between the tips of the shafts. It will be understood that I am not limited to the exact styles and shapes of parts herein used illustratively.

Two applications for combination shafts, companion with this, are filed of even date herewith and of serial numbers next preceding this.

I claim:

1. The combination, with a pair of side shaft members and a guiding draft device in a pair of shafts, of a pair of whiffletrees each centrally pivoted to said guiding draft device and each having its ends pivoted to said side shaft members respectively, substantially as and for the purposes specified.

2. A pair of combination shafts comprising a pair of shaft traces, a pair of whiffletrees each having its ends pivoted to the shaft traces respectively, and a guiding draft device pivoted to the center of said trees respectively; means for securing the guiding draft device to a vehicle and means for securing the shaft traces to other parts of a harness.

3. A pair of combination shafts comprising a pair of shaft traces, a pair of whiffletrees each having its ends pivoted to the shaft traces respectively, a whiffle-breast-element pivoted to the shaft traces respectively, and a guiding draft device pivoted to the centers of the whiffletrees respectively; means for securing the guiding draft device to a vehicle and means for securing the whiffle-breast-element to other parts of a harness.

4. The combination of a pair of shaft traces, a pair of whiffletrees each having its ends pivoted to the shaft traces respectively, and a whiffle breast element pivoted to the shaft traces respectively, means centrally located as to the whiffletrees for pivotally securing the whiffletrees to a vehicle, and means for securing the whiffle breast element to other parts of a harness.

5. In combination shafts, the combination, with a draft device having means for attachment to a vehicle, of a pair of whiffletrees, a pair of shaft traces and means pivotally connecting the ends of each whiffletree to the shaft traces respectively; means for securing the center of each tree to the draft device, and means for securing each shaft trace to a harness.

6. A pair of shafts comprising a pair of side shaft members and a pair of whiffletrees, said whiffletrees being spaced apart, the one in front of the other, and substantially of one length and parallel the one to the other, and each having its ends pivotally secured to the side shaft members respectively, and means centrally located as to said whiffletrees for securing said shafts to a vehicle.

7. In a pair of combination shafts, the combination, with a pair of side shaft members, a pair of whiffletrees and a draft device, of six separate and distinct flexible connections securing said parts together, each side shaft member being pivotally secured to its respective ends of the whiffletrees by one pair of said connections, and by the other pair thereof the centers of the trees are secured to the draft device.

8. In combination shafts, the combination, of a shaft trace having a draft eye secured thereto, and a draft device having a pair of draft eyes and a draft bolt engaging within the draft eyes of the draft device and detachably engaging within the draft eye of the shaft trace, means lockingly securing the draft bolt in draft relations to the draft eyes and means permanently securing the draft bolt within one of the draft eyes of the draft device, and means for securing the draft device to a hame or other part of a harness.

9. In combination shafts, the combination of a shaft trace having a draft eye secured thereto, and a draft device having a pair of draft eyes and a draft bolt engaging within said eyes and detachably engaging within the draft-eye of the shaft trace between said draft eyes, said draft bolt having a longitudinal groove therein terminating above the lower end thereof, means permanently securing the draft bolt within one of the draft eyes of the draft device and yet allowing the draft bolt to be turned and raised sufficient for detaching the shaft trace from the draft device, said means being adapted to operate within the groove of the draft bolt and retentively engage the lower end of the groove, and means for securing the draft device to a harness.

10. In combination shafts, the combination of a shaft trace having a draft eye secured thereto, and a draft device having a pair of draft eyes and a draft bolt within the draft eyes and detachably engaging within the draft eye of the shaft trace between the draft eyes of the draft device, and a spring automatically locking the draft bolt in draft relation to the draft eyes, and means permanently securing the draft bolt within one of the draft eyes of the draft device; said draft bolt having a longitudinal groove therein terminating above the lower end thereof, and said means being adapted to operate within the said longitudinal groove and retentively engage the lower end of said groove in the bolt when the bolt is turned, released from locking relations with the spring and raised sufficient for detaching the shaft trace from the draft device, and means for securing the draft device to a harness.

11. In combination shafts, the combination with the whiffletree and the shaft trace, of a connection comprising a screw-threaded draft pivot and a draft device having a correspondingly screw-threaded socket therein detachably engaging said screw-threaded pivot, said draft pivot being permanently secured to the end of the whiffletree and said socketed draft device being permanently secured to the shaft trace, substantially as and for the purposes set forth.

12. In apparatus using a whiffletree, the combination, with a pair of socketed draft devices, of a whiffletree having the ends thereof cylindrical and reversely screw threaded the one right and the other left and mounted within the sockets of said draft devices respectively, said sockets being also correspondingly screw-threaded the one right and the other left for coöperative draft engagement therewith; the arrangement being such that the length of the tree and hence the distance between the said draft devices may be graduated and said draft devices simultaneously attached to or detached from the whiffletree by a rotary movement of the whiffletree itself.

J. HAYS ALLIN.

Witnesses:
JULIA ALLIN TATE,
KATHERINE HOSTETLER.